CONTROL APPARATUS

Filed Aug. 16, 1963 2 Sheets-Sheet 1

INVENTOR.
ADRIAN J. MOSES
BY Roger W. Jensen
ATTORNEY

CONTROL APPARATUS

Filed Aug. 16, 1963 2 Sheets-Sheet 2

INVENTOR.
ADRIAN J. MOSES
BY
ATTORNEY

United States Patent Office 3,247,507
Patented Apr. 19, 1966

3,247,507
CONTROL APPARATUS
Adrian J. Moses, Rush City, Minn., assignor to Honeywell Inc., a corporation of Delaware
Filed Aug. 16, 1963, Ser. No. 302,573
7 Claims. (Cl. 340—347)

This invention relates to control apparatus and more particularly to synchronizers having substantially zero drift.

An synchronizer is an electronic device which has an output voltage that represents a level or signal on the input, or which maintains indefinitely an output which represents the input at the time the input was removed.

The invention comprises a binary counter which, in the quiescent state, has a known count registered therein. An alternating input signal, the magnitude of which is indicative of a given condition, is connected through a pulser and discriminator to the binary counter, the pulser operating to produce output pulses at a rate dependent upon the magnitude of the input signal, each pulser output pulse being coupled to the binary counter to cause the counter to increment by one count. The discriminator produces a first or second output depending upon the phase of the input signal, and these first and second outputs are coupled to the binary counter to cause the counter to count in a forward direction or in a reverse direction each time the pulser increments the counter.

Connected to each stage of the binary counter is a controllable switch means, each succeeding switch means having twice the conductance of the preceding switch. The lowest conductance switch is connected to the lowest order bit of the binary counter while the highest conductance switch is connected to the highest order bit of the binary counter. The outputs of the controllable switches are connected in common and the input to all of the switches are connected to a first source of alternating reference signals. A second source of alternating reference signals equal in magnitude to the first source, but 180° out of phase, is connected through a conductance to the common output circuit of the plurality of controllable switches. The magnitude of the conductance is equal to the combined conductance of the controllable switches which are conducting when the binary counter is at its reference count.

Since the first and second reference sources are 180° out of phase, and since these sources are connected through equal magnitude conductances to a common output circuit the output signal will be zero at the quiescent state.

When an alternating input signal is applied through the pulser and discriminator to the binary counter, the count in the binary counter will change and the number of controllable switch means which are in a conducting state will be changed. If the controllable switches are changed so that there is a greater conductance from the first source of reference signals, then an alternating output signal of a first phase will appear in the output, while of the controllable switches are changed so that there is less conductance from the first source of reference signals, then the second source of reference signals will predominate and there will be an alternating output signal of the opposite phase. The magnitude of the output signal is determined by the number of controllable switches which are held in a conducting or nonconducting state. The alternating output signal is fed back to the input and is algebraically summed with the alternating input signal to produce a null voltage at the input. When the input signal is nulled, the binary counter will stop counting and the synchronizer output signal will be indicative of the input signal.

A disengaging switch is provided which prevents the binary counter from changing count so that when the binary counter is disengaged the output of the synchronizer will "remember" what the input signal was at the time the binary counter was disengaged and the synchronizer will hold this output regardless of any variations in the input signal.

It is one object of this invention, therefore, to provide an improved solid state electronic synchronizer.

Another object of this invention is to provide a solid state electronic synchronizer which is highly stable and subject to substantially zero drift.

Figure 1:
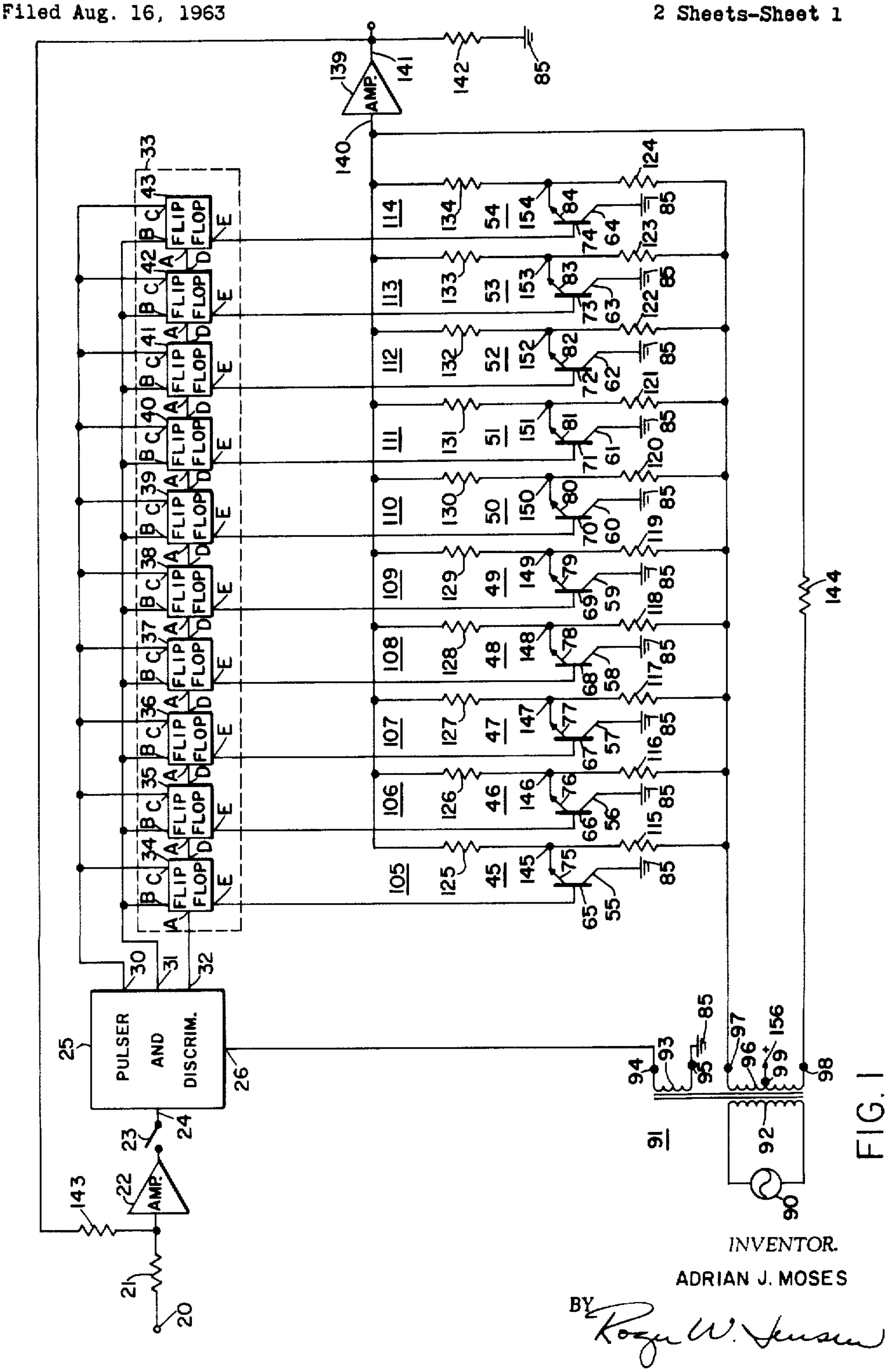
FIGURE 1 is a schematic representation of an embodiment of this invention.

These and other objects of my invention will become apparent to those skilled in the art upon consideration of the accompanying specification, claims, and drawings, of which:

*Structure of FIGURE 1*

Referring to FIGURE 1, there is shown an input terminal 20 connected through a resistor 21 to the input of an amplifier 22. The output of amplifier 22 is connected through a switch 23 to a first input 24 of a pulser and discriminator unit 25. Pulser and discriminator circuit 25 further has an input 26, an output 30, an output 31, and an output 32.

Figure 3:
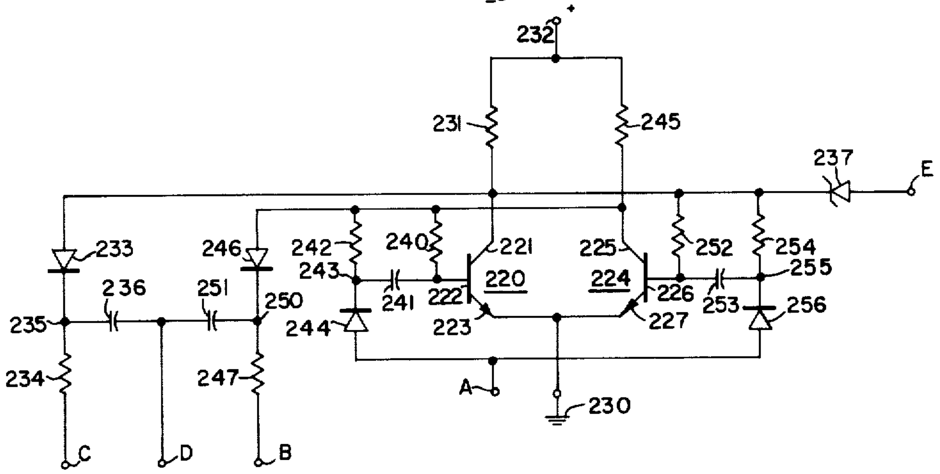
FIGURE 3 is a schematic representation of a flip-flop circuit used in the binary counter portion of the present invention.

A binary counter 33 comprises a plurality of flip-flop circuits 34 through 43, respectively, flip-flop 34 representing the lowest order bit of the binary counter, and flip-flop 43 representing the highest order bit. Each of the flip-flops 34 through 43 has a trigger input A, a control input B, a control input C, an output D, and an output E. The D output of each of the flip-flops is connected to the A input of the next succeeding higher order bit flip-flop. A schematic diagram of a flip-flop suitable for use in the binary counter 33 is shown in FIGURE 3 and will be explained hereinafter.

While the flip-flops of FIGURE 1 are shown connected to form a cascaded counter, it should be understood that if the propagation time of the cascaded counter creates a problem, that the counter stage 33 can be replaced with a parallel counter so that the time required for the counter to change count would be substantially reduced. Parallel counters are discussed on page 491 of "Digital Computer and Control Engineering," by Robert S. Ledley; McGraw Hill, 1960.

Output 32 of pulser and discriminator circuit 25 is connected to the A input of flip-flop 34. Output 30 of pulser and discriminator 25 is connected to each of the C inputs of flip-flops 34 through 43 respectively, while output 31 of pulser and discriminator 25 is connected to each of the B inputs of flip-flops 34 through 43.

A plurality of current control means, or switch means, in this case shown as a plurality of transistors 45 through 54 have collector electrodes 55 through 64, respectively, base electrodes 65 through 74 respectively, and emitter electrodes 75 through 84, respectively.

The E outputs of flip-flops 34 through 43 of binary counter 33 are respectively connected to the base electrodes 65 through 74 of transistors 45 through 54. The collector electrodes 55 through 64 of transistors 45 through 54 are connected to ground 85.

A source of alternating signals 90 is connected across a primary winding 92 of a transformer 91. Transformer 91 further has a secondary winding 93 having end terminals 94 and 95 and a secondary winding 96 having end terminals 97 and 98, and a center tap terminal 99. End terminal 94 of secondary winding 93 is connected to input 26 of the pulser and discriminator circuit 25, while end terminal 95 of secondary winding 93 is connected to ground 85.

End terminal 97 of secondary winding 96 is connected through a plurality of parallel conductances 105 through 114. Conductances 105 through 114 comprise first resistances 115 through 124 respectively, in series with second resistances 125 through 134 respectively. The outputs of conductances 105 through 114 are connected in common to an input 140 of an amplifier 139. Amplifier 139 further has an output 141 which is connected through a load resistor 142 to ground 85, and by means of a resistor 143 to the input of amplifier 22.

Emitters 75 through 84 of transistors 45 through 54 respectively are respectively connected to junction terminals 145 through 154 between the first and second resistances of conductances 105 through 114 respectively.

End terminal 98 of secondary winding 96 is connected through a conductance 144 to the input 140 of amplifier 139. Center tap terminal 99 of secondary winding 96 is connected to a source of positive potential 156.

The conductances 105 through 114 are arranged in a binary fashion with conductance 105 representing the lowest order bit, while conductance 114 represents the highest order bit. That is, the conductance 106 is twice that of 105 while the conductance 107 is twice that of 106, etc.

*Operation of FIGURE 1*

In the quiescent state, that is, in the absence of an input signal to input terminal 20, an arbitrary predetermined count will be registered in binary counter 33. Since binary counter 33 is shown as a ten bit counter, a count of 512 would be the center count and would be represented by flip-flops 34 through 42 being in the "zero" state, while flip-flop 43 is in the "one" state. When flip-flops 34 through 42 are in the "zero" state, output signals will appear at the E outputs of these flip-flops which are coupled to the bases of transistors 45 through 53 respectively, thereby holding these transistors in an "on" or conducting state. At tthe same time, an output signal will appear at the E output of flip-flop 43 which is coupled to the base 74 of transistor 54 thereby holding transistor 54 in its "off" or non-conducting state.

The conduction of alternating source 90 through the primary winding 92 of transformer 91 induces a signal in the secondary winding 96 such that the signal appearing between end terminal 97 and center tap terminal 99 is equal in magnitude and 180° out of phase with the signal appearing between end terminal 98 and center tap terminal 99.

The signal appearing at end terminal 97 of transformer secondary 96 is coupled to the inputs of conductances 105 through 114. This signal is coupled through resistances 115 through 124 of conductances 105 through 114 respectively to junction terminals 145 through 154 respectively. The conduction of transistors 45 through 53 hold junction terminals 145 through 153 respectively, at substantially ground potential and hence the signal from end terminal 97 of secondary winding 96 is effectively shorted to ground. Transistors 45 through 54 each have a high reverse beta characteristic so that junction terminals 145 through 154 are held at substantially ground potential when the transistors are conducting, regardless of the instantaneous polarity of the signal appearing at end terminal 97 of secondary winding 96. However, since transistor 54 is in the nonconducting state, the signal from end terminal 97 of secondary winding 96 is coupled through resistance 124 and resistance 134 to the input 140 of amplifier 139.

At the same time an equal and opposite signal, appearing between end terminal 98 and center tap terminal 99, is coupled through conductance 144 to the input 140 of amplifier 139. Transformer secondary 96 between end terminal 97 and center tap terminal 99 in conjunction with conductances 105 through 114 and transistors 45 through 54 can be thought of as a first source of alternating reference signals, while transformer secondary 96 between end terminal 98 and center tap terminal 99 can be thought of as a second source of alternating reference signals, the second source of reference signals being equal in magnitude and 180° out of phase with the first source.

The magnitude of the first source of alternating signals is controlled by the operation of binary counter 33 while the magnitude of the second source is constant. The conductance value of conductance 144 is equal to the value of conductance unit 114, and since the two signals from the first and second reference source are equal in magnitude in 180° out of phase, these signals cancel in the input of amplifier 139 and substantially no signal appears at output 141 of amplifier 139.

Assume now that an alternating input signal having a magnitude indicative of a given condition is applied to input terminal 20. This signal is coupled through a resistor 21 and amplifier 22 to switch 23. If switch 23 is closed, the signal will be coupled to the pulser and discriminator circuit 25. A reference signal from the secondary winding 93 of transformer 91 is coupled to input 26 of pulser and discriminator circuit 25 and the phase of the reference signal is compared with the phase of the input signal from input terminal 20. If the input signal and the reference signal from secondary 93 are in phase, the signal will appear at output 30 of pulser and discriminator unit 25 and will be coupled to the C inputs of flip-flops 34 through 43 of binary counter 33. The signal at the C inputs of flip-flops 34 through 43 cause binary counter 33 to operate as a forward counter.

As long as there is an input signal applied to input 20, the pulser and discriminator unit 25 will generate output pulses on output 32, the number of pulses being dependent upon the magnitude of the input signal. Each of these pulses are coupled to the A input of flip-flop 34 of binary counter 33 and causes the count in binary counter 33 to change by one count. Since the signal on the C inputs of flip-flops 34 through 43, from output 30 of pulser and discriminator 35, causes counter 33 to operate as a forward counter, the first pulse from output 32 of pulser and discriminator 25 will cause the count in binary counter 33 to increase by one. This means that the state of flip-flop 34 will reverse and a signal will be reproduced at output E of flip-flop 34 which is coupled to the base 65 of transistor 45, thereby switching transistor 45 to its nonconducting or "off" state. Since transistor 45 is off, the signal appearing at end terminal 97 of transformer secondary winding 96 will be coupled through conductance 105 as well as conductance 114. The combined conductances 114 and 105 are greater than conductance 144 so that when the first reference source, coupled through conductances 114 and 105, and the second reference source, coupled through conductance 144, are summed in the input 140 of amplifier 139, the first reference source will predominate and a signal will appear at output 141 of amplifier 139. This signal is out of phase with the input signal applied to input 20 and is coupled through resistor 143 and summed with the input signal in the input of amplifier 22.

The second output pulse at output 32 of pulser and discriminator 25 again causes binary counter 33 to increase by one count. This means that flip-flop 34 will switch to its "zero" state while flip-flop 35 will switch to its "one" state. When flip-flop 35 is in the "one" state, the output signal at output E of flip-flop 35 is coupled to base 66 of transistor 46 causing transistor 46 to switch to its "on" state, while the output at output terminal E of flip-flop 34 coupled to base 65 of transistor 45 again switches transistor 45 to its "on" state. The signal from the first source of reference potential appearing at end terminal 97 of secondary winding 96 will now be coupled through conductances 106 and 114 to the input 140 of transistor 139, and will there be summed with the second source of reference potential coupled through conductance 144 to the input 140 of the amplifier 139. Since conductance 106 is larger than 105, the magnitude of the first source signal appearing at input 140 of amplifier 139 will have increased and therefore, the resultant signal appearing at output 141 of amplifier 139 will have increased. This signal is again coupled through resistor 143 and is summed with the input signal in the input of amplifier 22. This process will repeat, that is, the count in flip-flop 33 changing once each input pulse, until the output signal appearing at 141 is equal and opposite to the input signal applied at terminal 20 so that the resultant summation of the two signals in the input of amplifier 22 is substantially zero. At this time, there will be no output pulses at output 32 of pulser and discriminator 25 and hence, binary counter 33 will cease counting. The output signal at output 141 of amplifier 139 is now indicative of the input signal applied at input terminal 20. If switch 23 is now opened the input signal can be removed from input terminal 20 and the output signal at terminal 141 of amplifier 139 will remain, thereby "remembering" what the input signal was at terminal 20 at the time it was removed. The synchronizer will remember this input signal for an indefinite time, and this signal can be used to return a system to an exact given condition at some later time.

If the input signal at input terminal 20 had been of an opposite phase with respect to the reference signal in the secondary 93 of transformer 91, then an output signal would appear at output 31 of pulser and discriminator circuit 25 and this signal would be coupled to the B inputs of flip-flops 34 through 43 respectively, of binary counter 33 thereby causing binary counter 33 to act as a "reverse" counter. The output pulses on output 32 of pulser and discriminator 25, would then cause binary counter 33 to count in a reverse direction. The first pulse would cause flip-flop 43 to switch to the "zero" state while flip-flops 34 through 42 all switch to the "one" state. Output signals at the E outputs of flip-flops 34 through 42 would be coupled to the bases of transistors 45 through 53 switching these transistors to their "off" states, while the output signal at output terminal E of flip-flop 43 would be coupled to the base of transistor 54 causing transistor 54 to switch to its "on" state. The signal from the first reference source, at end terminal 97 of secondary winding 96, will now be coupled through conductances 105 through 113 to the input 140 of amplifier 139. Since the combined conductances of conductances 105 through 113 is less than the conductance 144, the signal from the second reference source appearing at end terminal 98 of secondary 96 will predominate at the input 140 of amplifier 139. The resulting signal will then be amplified by amplifier 139 and fed back through resistor 143 to the input of amplifier 22 where it will be summed with the input signal applied from input terminal 20 through resistor 21 to the input of amplifier 22. Binary counter 33 will continue to count in a reverse direction until the output signal appearing at output 141 is substantially equal and opposite to the input signal so that the algebraic summation of the output and input signals at the input of amplifier 22 produces a substantially zero output signal at the output of amplifier 22.

Figure 2:
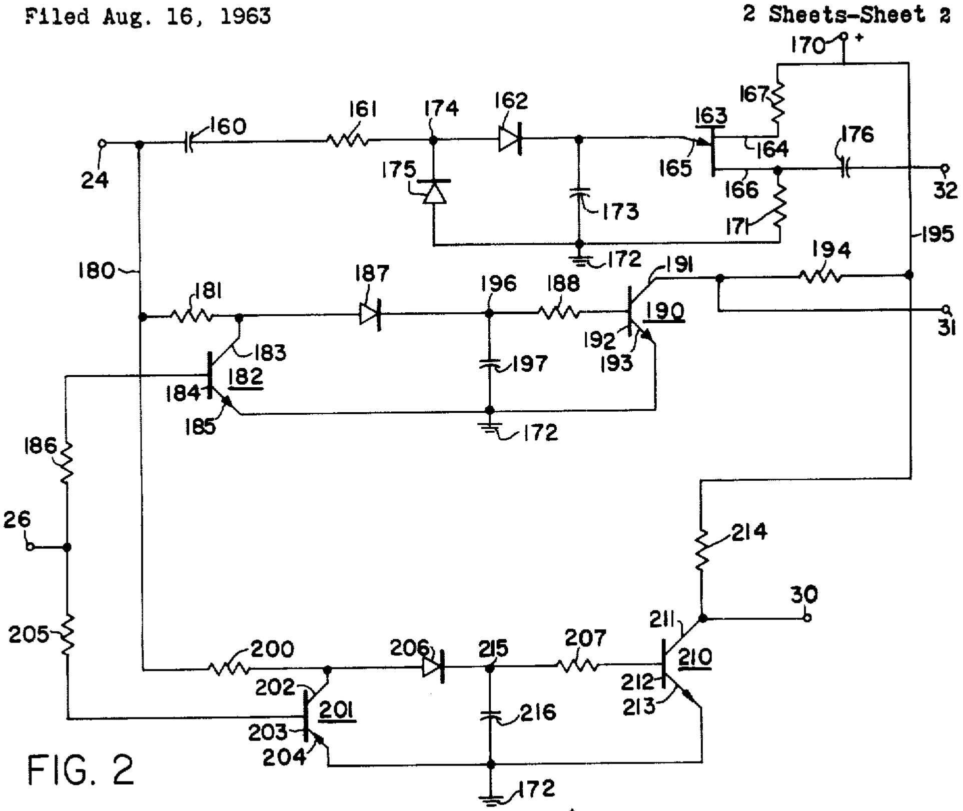
FIGURE 2 is a schematic representation of a pulser and discriminator used in this invention.

*Structure of FIGURE 2*

Referring to FIGURE 2, there is shown a schematic diagram of a pulser and discriminator circuit suitable for use in the embodiment of the invention shown in FIGURE 1. Input and output terminals of the pulser and discriminator circuit of FIGURE 2 are given the same reference numerals as used in FIGURE 1.

Input terminal 24 is connected through a series circuit comprising a capacitor 160, a resistor 161, and a diode 162 to an emitter 165 of a unijunction transistor 163. Unijunction transistor 163 further has a base 164 and a base 166. Base 164 of transistor 163 is connected by means of a resistor 167 to a positive source of energizing potential 170. Base 166 of transistor 163 is connected by means of a resistor 171 to ground 172. Emitter 165 of transistor 163 is connected by means of a capacitor 173 to ground 172. A junction 174 between resistor 161 and diode 162 is connected by means of a reverse poled diode 175 to ground 172. Base 166 of transistor 163 is further connected by means of a capacitor 176 to output terminal 32. Capacitor 160, resistor 161, diode 162, capacitor 173, and diode 175 form a voltage doubler circuit.

Input terminal 24 is further connected by means of a conductor 180 in series with a resistor 181 to a collector 183 of a transistor 182. Transistor 182 further has a base 184 and an emitter 185. Emitter 185 of transistor 182 is connected directly to ground 172. Base 184 of transistor 182 is connected by means of a resistor 186 to input terminal 26. Collector 183 of transistor 182 is connected by means of a diode 187 in series with a resistor 188 to a base 192 of a transistor 190. Transistor 190 further has a collector 191 and an emitter 193. Emitter 193 of transistor 190 is connected to ground 172. Collector 191 of transistor 190 is connected by means of a resistor 194 in series with a conductor 195 to the positive potential source 170. Collector 191 of transistor 190 is directly connected to output terminal 31. A junction 196 between diode 187 and resistor 188 is connected by means of a capacitor 197 to ground 172.

Input 24 is further connected through conductor 180 in series with a resistor 200 to a collector 202 of a transistor 201. Transistor 201 further has a base 203 and an emitter 204. Emitter 204 of transistor 201 is connected directly to ground 172. Base 203 of transistor 201 is connected by means of a resistor 205 to input 26. Collector 202 of transistor 201 is connected by means of a diode 206 in series with a resistor 207 to a base 212 of a transistor 210. Transistor 210 further has a collector 211 and an emitter 213. Emitter 213 of transistor 210 is connected directly to ground 172. Collector 211 of transistor 210 is connected directly to output terminal 30, and by means of a resistor 214 in series with conductor 195 to the positive potential source 170. A junction 215 between diode 206 and resistor 207 is connected by means of a capacitor 216 to ground 172.

*Operation of FIGURE 2*

The alternating input signal at terminal 24 is coupled through capacitor 160, resistor 161, and diode 162 to the emitter 165 of unijunction transistor 163. The negative half cycle of the alternating input signal causes capacitor 160 to charge through diode 175 and resistor 161. The positive half cycle of the alternating input signal and the charge on capacitor 160 due to the negative half cycle of the input signal are fed through resistor 161 and diode 162 and charge capacitor 173. When the charge on capacitor 173 is sufficient, unijunction transistor 163 conducts and a current flows from the positive potential source 170 through resistor 167, base 164 to base 166 of transistor 163, and resistor 171 to ground 172. The conduction of unijunction transistor 163 produces a positive pulse across resistor 171 and this signal is coupled through capacitor 176 to output terminal 32. When unijunction transistor 163 conducts, capacitor 173 discharges through the emitter 165 to base 166 of unijunction transistor 163 and resistor 171. When capacitor 173 has discharged sufficiently, unijunction transistor 163 will cease conduction. If the positive half cycle of the input signal is still present at input 24, capacitor 173 will again charge and cause unijunction transistor to conduct thereby producing another pulse at output 32. The number of pulses produced at output 32 is dependent upon the magnitude of the alternating input signal applied at input 24. As explained in conjunction with the operation of FIGURE 1, the pulses at output 32 are coupled to the binary counter 33 and causes counter 33 to increment one count.

The alternating input signal at terminal 24 is further conducted through conductor 180 and resistor 181 to the collector 183 of transistor 182, and through conductor 180 and resistor 200 to the collector 202 of transistor 201. The bases 184 and 203 of transistors 182 and 201 respectively, are respectively connected through resistors 186 and 205 to input terminal 26. As explained in conjunction with the operation of FIGURE 1, terminal 26 is connected to a reference signal appearing on secondary winding 93 of transformer 91 (see FIGURE 1). When the reference signal occurring at terminal 26 is positive, the signal is coupled through resistor 186 to the base 184 of transistor 182 and causes transistor 182 to conduct, thereby shorting out the signal on the collector 183 of transistor 182. The positive signal from terminal 26 coupled through resistor 205 to the base 203 of transistor 201 back biases the emitter base junction of transistor 201 and holds the transistor in its nonconducting state. When the reference signal at terminal 26 goes negative, this signal is coupled through resistor 205 to the base 203 of transistor 201 thereby causing transistor 201 to conduct and shorting out the signal on its collector 202.

Assume that the input signal at terminal 24 is in phase with the reference signal at terminal 26 so that both terminals 24 and 26 move in a positive direction at the same time. As explained previously, the positive going input signal at terminal 24 will be coupled to the collectors 183 and 202 of transistors 182 and 201 respectively. The positive signal at terminal 26 will cause transistor 182 to conduct thereby shorting out the signal on its collector. However, the positive signal at 26 further holds transistor 201 in its non-conducting state so that the positive signal on the collector 202 of transistor 201 is further coupled to diode 206 and resistor 207 to the base 212 of transistor 210, thereby causing transistor 210 to conduct. The conduction path to transistor 210 is from the positive potential source 170, through conductor 195, resistor 214, and collector 211 to emitter 213 of transistor 210 to ground 172. When transistor 210 conducts, the potential on its collector 211 drops to substantially ground potential and this negative going signal is coupled to output 30. As explained in conjunction with FIGURE 1, output 30 is connected to the C inputs of the flip-flops 34 through 43 of binary counter 33 and the ground signal at terminal C causes binary counter 33 to count in a forward direction. If the input signal at terminal 24 is 180° out of phase, the reference signal at terminal 26 will go positive when terminal 24 goes negative. As explained previously, the positive signal from terminal 24 will be coupled to the collectors of transistors 182 and 201. The negative signal at terminal 26 will be coupled through resistor 205 to the base 203 of transistor 201 to conduct. Since transistor 201 has a high reverse beta characteristic, the positive signal in the collector of transistor 201 will be effectively shorted to ground 172. The negative signal at terminal 26 is further coupled through resistor 186 to the base 184 of transistor 182 thereby holding transistor 182 in its nonconducting state. Since transistor 182 is nonconducting, the positive signal at its collector 183 will be coupled through diode 187 and resistor 188 to the base 192 of transistor 190, thereby causing transistor 190 to conduct. The conduction path for transistor 190 is from the positive source 170, through conductor 195, resistor 194, and collector 191 to emitter 193 of transistor 190 to ground 172. The conduction of transistor 190 causes collector 191 to drop to substantially ground potential. This ground potential signal is coupled to output terminal 31. As explained previously in conjunction with FIGURE 1, output terminal 31 is connected to the B inputs of flip-flops 34 through 43 of the binary counter 33, and the ground signal at the B terminals causes counter 33 to operate as a reverse counter.

*Structure of FIGURE 3*

Referring to FIGURE 3, there is shown a first transistor 220 having a collector 221, a base 222, and an emitter 223, and a second transistor 224 having a collector 225, a base 226, and an emitter 227. Emitter 223 of transistor 220 is connected directly to emitter 227 of transistor 224, and is further connected to ground 230. Collector 221 of transistor 220 is connected by means of a resistor 231 to a source of positive energizing potential 232, and by means of a diode 233 in series with a resistor 234 to the C input terminal. A junction 235 between diode 233 and resistor 234 is connected by means of a capacitor 236 to the D output terminal. Collector 221 of transistor 220 is further connected by means of a zener diode 237 to the E output terminal. Base 222 of transistor 220 is connected to the collector 225 of transistor 224 by means of a resistor 240 in parallel with a series connected capacitor 241 and resistor 242. The junction 243 between capacitor 241 and resistor 242 is connected by means of a reverse poled diode 244 to the A input terminal.

Collector 225 of transistor 224 is connected by means of a resistor 245 to the positive source of energizing potential 232, and by means of a diode 246 in series with a resistor 247 to the B input terminal. A junction 250 between diode 246 and resistor 247 is connected by means of a capacitor 251 to the D output terminal. Base 226 of transistor 224 is connected by means of a resistor 252 in parallel with a series connected capacitor 253 and a resistor 254 to the collector 221 of transistor 220. A junction 255 between capacitor 253 and resistor 254 is connected by means of a reverse poled diode 256 to the A input terminal.

*Operation of FIGURE 3*

Transistors 220 and 224 in conjunction with their associated circuitry form a flip-flop circuit suitable for use in the binary counter 33 of FIGURE 1. The flip-flop circuit is in the binary "zero" state when transistor 220 is in the nonconducting state and transistor 224 is in the conducting state, and is in the binary "one" state when transistor 220 is conducting and transistor 224 is nonconducting.

Assume that the flip-flop is in its binary "zero" state, that is, transistor 220 is nonconducting and transistor 224 is conducting. A positive input pulse at terminal A, from output 32 of the pulser and discriminator circuit 25, will be coupled through diode 244 and capacitor 241 to the base 222 of transistor 220, and will cause transistor 220 to conduct. The conduction path for transistor 220 is from the positive potential source 232 through resistor 231, and collector 221 to emitter 223 of transistor 220 to ground 230. The conduction of transistor 220 causes the potential on its collector 221 to drop to substantially ground potential and this negative going signal is coupled through resistor 252 to the base 226 of transistor 224 and decreases the conduction of transistor 224. When the conduction of transistor 224 decreases, the potential on its collector 225 becomes more positive and this positive going signal is coupled through resistor 240 to the base 222 of transistor 220 thereby causing transistor 220 to conduct harder. This regenerative action continues until transistor 220 is in saturation and transistor 224 is cut off, or in other words, until the flip-flop circuit registers a binary "one."

If the flip-flop circuit produces an output pulse at the D output terminal, when the flip-flop switches from the binary one state to the binary zero state, then the flip-flop is effectively counting in a forward direction. On the other hand, if the flip-flop produces a positive output pulse at the D terminal when the flip-flop changes from a binary zero state to a binary one state, then the flip-flop is counting in a reverse direction. The signals applied to terminals B and C of the flip-flop from output terminals 31 and 30 respectively, of the pulser and discriminator circuit 25 determine whether or not the flip-flop will count in a forward or reverse direction. When the flip-flop is counting in a forward direction, the signal applied to the C input of the flip-flop from terminal 31 of pulser and discriminator circuit 25 will be substantially ground potential, while the signal applied to the B input of the flip-flop from terminal 31 of pulser and discriminator circuit 25 will be substantially equal to the positive potential source 170 (see FIGURE 2). The positive potential applied to the B input of the flip-flop of FIGURE 3 will be coupled through resistor 247 and will back bias diode 246, while the substantially ground potential applied to the C terminal will be coupled to resistor 234 to diode 233 thereby allowing diode 233 to conduct.

When the flip-flop is switched from its binary "one" state to its binary "zero" state, transistor 220 ceases conduction, while transistor 224 begins conduction. When transistor 220 cuts off, the potential on its collector 221 goes positive and this positive signal is coupled through diode 233 and capacitor 236 to the output terminal D. On the other hand, when the flip-flop goes from its binary zero state to its binary one state, transistor 220 begins conducting while transistor 224 cuts off. When transistor 224 cuts off, the potential on its collector 225 goes positive and this positive going signal is coupled to the anode of diode 246. However, since diode 246 is back biased due to the positive potential source applied from terminal B, the positive going signal on the collector of transistor 224 is blocked by diode 246 and hence does not appear at output terminal D.

When the flip-flop circuit operates as a reverse counter, the potentials at the terminals B and C are reversed, that is, the positive potential is applied to terminal C while the ground potential is applied to terminal B. In this case the positive output pulse appears at terminal D when the flip-flop changes from its binary zero state to its binary one state.

It is to be understood that while I have shown a specific embodiment of my invention, that this is for the purpose of illustration only and that my invention is to be limited solely by the scope of the appended claims.

I claim as my invention:

1. Apparatus of the class described comprising:
an amplifier having an input and an output;
an alternating input signal supplying means connected to the input of said amplifier, the magnitude of said input signal being indicative of a given condition;
a pulser connected to the output of said amplifier, said pulser producing output pulses;
a discriminator connected to the output of said amplifier, the output of said discriminator being indicative of the phase of said input signal;
a counter circuit;
means connecting said pulser to said counter circuit, each output pulse from said pulser changing the counter count by one;
means connecting said discriminator output to said counter to cause the counter to count in an increasing or decreasing direction from a predetermined reference count depending upon the phase of the input signal;
a first source of alternating signals having a predetermined reference magnitude;
a second source of alternating signals having said predetermined reference magnitude, said second source being 180° out of phase with said first source;
means connecting said counter circuit to said first source of alternating signals, the magnitude of said first source of alternating signals varying from said reference magnitude in response to changes in the counter circuit count from said predetermined reference count;
means connected to said first and second sources of alternating signals for algebraically summing the first and second signals to produce an output signal;
and means connecting said output signal to the input of said amplifier to null said alternating input signal.

2. Apparatus of the class described comprising:
a counter having a plurality of stages;
means for changing the counter count in response to an input signal;
means for causing said counter to count in a forward direction or in a reverse direction in response to the phase of an input signal;
a plurality of controllable switch means each having an input and an output;
means connecting the outputs of said plurality of switch means in common, said plurality of switch means being arranged so that each switch means has twice the conductance of the preceding switch means;
means connecting each stage of said counter so as to control the conduction of one of said switch means, the lowest order stage of said counter controlling the lowest conductance switch means and the highest order stage of said counter controlling the highest conductance switch means;
a first and a second source of reference signals, said first and second reference signals being 180° out of phase with each other;
means connecting said first source of reference signals to the inputs of all of said switch means;
conductance means connecting the second source of reference signals to the common outputs of said switch means, said conductance means having a conductance substantially equal to the conductance of the highest order switch means;
and means connected to the common outputs of said swith means to provide a feedback signal to null an input signal.

3. Apparatus of the class described comprising:
an amplifier having an input and an output;
an alternating input signal supplying means connected to the input of said amplifier;
a pulser connected to the output of said amplifier, said pulser producing output pulses;
a discriminator connected to the output of said amplifier, said discriminator producing an output indicative of the phase of said input signal;
a counter having a plurality of stages;
means connecting the pulse output of said pulser to said counter for changing the counter count;
means connecting said discriminator output to said counter to cause said counter to count in a forward direction or in a reverse direction depending upon the phase of said input signal;
a plurality of controllable switch means each having an input and an output;
means connecting the outputs of said plurality of switch means in common, said plurality of switch means being arranged so that each switch means has substantially twice the conductance of the preceding switch means;
means connecting each stage of said counter so as to control the conduction of one of said switch means, the lowest order stage of said counter controlling the lowest conductance switch means and the highest order stage of said counter controlling the highest conductance switch means;
a first and a second source of reference signals, said first and second reference signals being 180° out of phase with each other;
means connecting said first source of reference signals to the inputs of all of said switch means;
conductance means connecting the second source of reference signals to the common output of said switch means, said conductance means having a conductance susbtantially equal to the conductance of the highest order switch means;

means connecting the common outputs of said plurality of switch means degeneratively to the input of said amplifier to null said input signal;

and means connecting the common outputs of said plurality of switch means to an output terminal.

4. Apparatus of the class described comprising:

a binary counter;

means for connecting an alternating input signal to said binary counter, the count in said counter changing as a function of the magnitude of the input signal, the count in said counter changing in an increasing or decreasing direction from a predetermined reference count depending upon the phase of the input signal;

a first source of alternating signals having a predetermined reference magnitude;

a second source of alternating signals having said predetermined reference magnitude, said second source being 180° out of phase with said first source;

means connecting said binary counter to said first source of alternating signals, the magnitude of said first source of alternating signals varying from said reference magnitude in response to changes in the counter count from said predetermined reference count;

means connected to said first and second sources of alternating signals for algebraically summing the first and second signals to produce an output signal;

and means for algebraically summing said output signals and said input signal to the binary counter.

5. Apparatus of the class described comprising:

a first source of alternating signals;

a second source of signals having a magnitude responsive to an input signal, said second source of signals being 180° out of phase with said first source of signals;

means for algebraically summing said first and second signals to produce an output signal;

and means for algebraically summing said output signal and said input signal.

6. Apparatus of the class described comprising:

an amplifier having an input and an output;

an alternating input signal supplying means connected to the input of said amplifier;

a pulser connected to the output of said amplifier, said pulser producing output pulses;

a discriminator connected to the output of said amplifier, said discriminator producing an output indicative of the phase of said input signal;

a counter having a plurality of stages;

means connecting the pulse output of said pulser to said counter for changing the counter count;

means connecting said discriminator output to said counter to cause said counter to count in a forward direction or in a reverse direction depending upon the phase of said input signal;

a plurality of controllable first switch means each having an input and an output;

means connecting the outputs of said plurality of first switch means in common, said pluraltiy of first switch means being arranged so that each of said first switch means has substantially twice the conductance of the preceding switch means;

means connecting each stage of said counter so as to control the conduction of one of said first switch means, the lowest order stage of said counter controlling the lowest conductance switch means and the highest order stage of said counter controlling the highest conductance switch means;

a first and a second source of reference signals, said first and second reference signals being 180° out of phase with each other;

means connecting said first source of reference signals to the inputs of all of said first switch means;

conductance means connecting the second source of reference signals to the common output of said first switch means, said conductance means having a conductance substantially equal to the conductance of the highest order switch means;

means connecting the common outputs of said plurality of first switch means degeneratively to the input of said amplifier to null said input signal;

means connecting the common outputs of said plurality of first switch means to an output terminal;

and second switch means connected to said counter to prevent the count in said counter from changing when said second switch means is actuated.

7. Apparatus of the class described comprising:

an amplifier having an input and output;

an alternating input signal supplying means connected to the input of said amplifier, the magnitude of said input signal being indicative of a given condition;

a pulser having an input and an output, said pulser producing output pulses;

a discriminator having an input and an output, the output signal of said discriminator being indicative of the phase of an input signal;

switch means connecting the output of said amplifier to the inputs of said pulser and said discriminator;

a counter circuit;

means connecting the output of said pulser to said counter circuit, each output pulse from said pulser changing the counter count by one;

means connecting said discriminator output to said counter to cause the counter to count in an increasing or decreasing direction from a predetermined reference count depending upon the phase of the input signal;

a first source of alternating signals having a predetermined reference magnitude;

a second source of alternating signals having said predetermined reference magnitude, said second source being 180° out of phase with said first source;

means connecting said counter circuit to said first source of alternating signals, the magnitude of said first source of alternating signals varying from said reference magnitude in response to changes in the counter circuit count from said predetermined reference count;

means connected to said first and second sources of alternating signals for algebraically summing the first and second signals to produce an output signals;

and means connecting said output signal to the input of said amplifier to null said alternating input signal.

References Cited by the Examiner

UNITED STATES PATENTS

| | | | |
|---|---|---|---|
| 2,965,891 | 12/1960 | Martin | 340—347 |
| 2,988,737 | 6/1961 | Schroeder | 340—347 |

DARYL W. COOK, *Acting Primary Examiner.*

MALCOLM A. MORRISON, *Examiner.*

A. L. NEWMAN, *Assistant Examiner.*